Jan. 13, 1942.    J. MORKOSKI    2,269,981
SPRING RELEASE HITCH
Original Filed March 26, 1940    2 Sheets-Sheet 1

Inventor
James Morkoski
By Paul O. Pippel
Att'y

Jan. 13, 1942.  J. MORKOSKI  2,269,981
SPRING RELEASE HITCH
Original Filed March 26, 1940  2 Sheets-Sheet 2

Inventor
James Morkoski
By Paul O Pippel
Atty

Patented Jan. 13, 1942

2,269,981

UNITED STATES PATENT OFFICE 2,269,981

SPRING RELEASE HITCH

James Morkoski, Canton, Ill., assignor to International Harvester Company, a corporation of New Jersey Original application March 26, 1940, Serial No. 326,065. Divided and this application February 10, 1941, Serial No. 378,256

6 Claims. (Cl. 280—33.16)

This invention relates to spring release hitches for the connection of implements to tractors.

This application is a division of the application filed by the present inventor on March 26, 1940, Serial No. 326,065, and relating to spring release devices.

The object of the present invention is to provide a spring release hitch for the connection of implements to tractors which is of simple construction and cheap to manufacture in that only minimum parts are required.

It is another object of the invention to provide a novel arrangement in a spring hitch, wherein the same is readily adjustable to different tensions required for the different implements and wherein this adjustment is of simple construction.

According to the present invention, use is made of the buckling ability of a coil spring for effecting release of a latching element from locked engagement with a cooperating element. The latch element is pivotally connected to a member which may be the part of either an implement or a tractor, and this latch element has connected to the same a coil spring extending between the same and a base member. This spring is connected to the pivoted latch member and to the base member by means of lever elements so shaped as to throw the longitudinal axis of the coil spring offset with the axis of connection of the pivotal elements with the respective pivotal latch and base members. When excessive strain is placed upon the latch element, the coil spring, due to its offset connection, will tend to contract along one side and then suddenly buckle to relieve the latch element or the implement. In the present arrangement the release mechanism is carried by the pull-behind implement, and the cooperating part is carried by the tractor. It should be evident, however, that the release spring and latch element could as well be carried by the tractor, and the cooperating part could be disposed on the implement.

As a means for adjusting the resisting effectiveness of the buckling spring, there is provided an adjusting screw carried by the base member, the head of which is adapted to contact with the side of the coil spring intermediate its length. As an initial slight buckling is given to the coil spring by this adjusting means, the force required to finally buckle the coil spring is decreased.

For other objects and for a better understanding of the invention, reference may be had to the following detailed description taken in connection with the accompanying drawings, in which.

Figure 1:
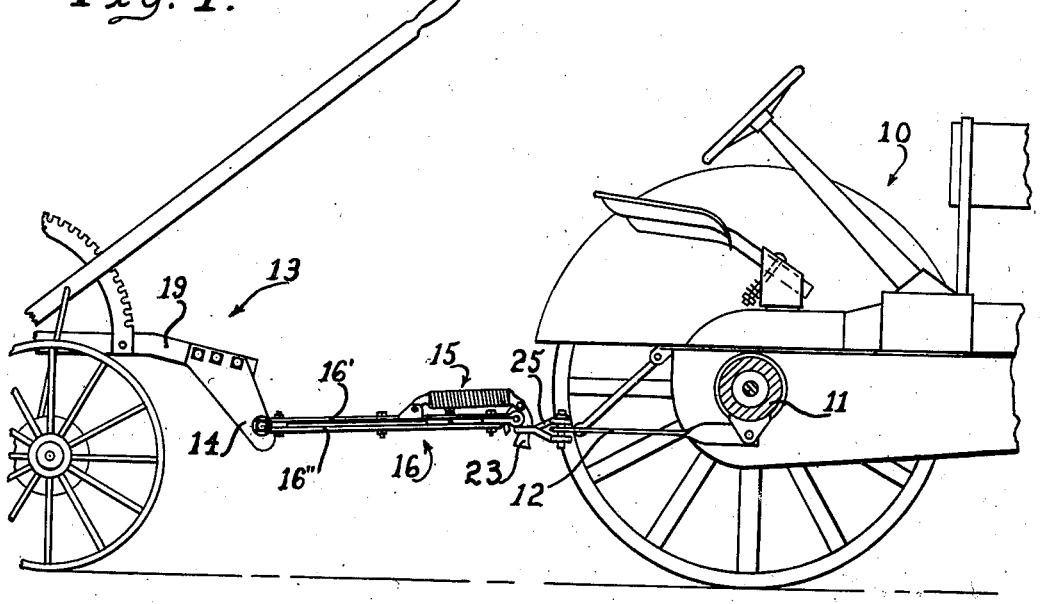
Figure 1 is a view in elevation of a part of a tractor and of a part of an implement with the release being carried by the implement and the same connected to the cooperating element on the tractor.
Figure 2:
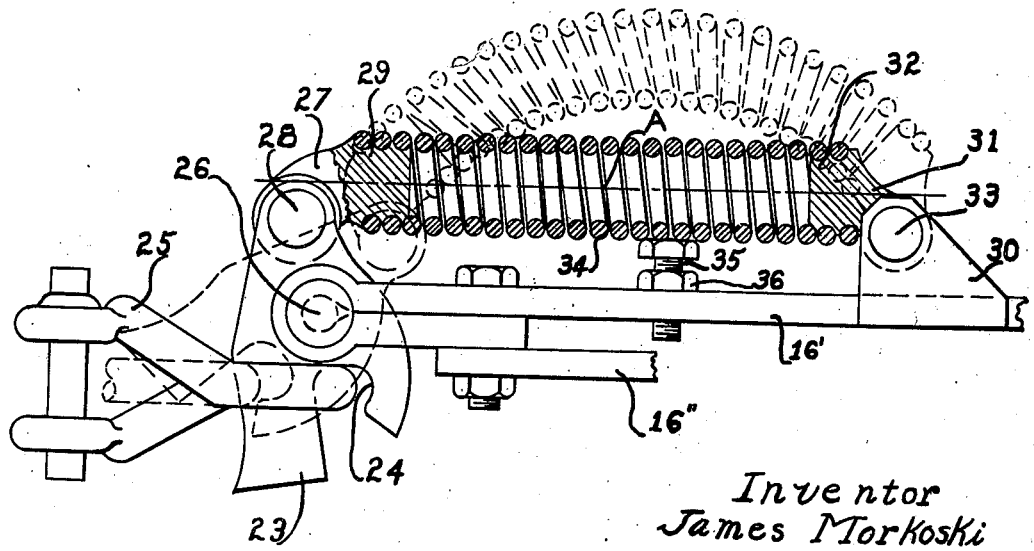
Figure 2 is an enlarged view of the release device showing in full the position of the spring while the implement is being drawn and showing in dotted the buckled position of the spring and the pivoted position of the latch at the time of release of the implement from the tractor; and, Figure 3 is a plan view of the forward part of the implement and of the release device thereon.
Figure 3:
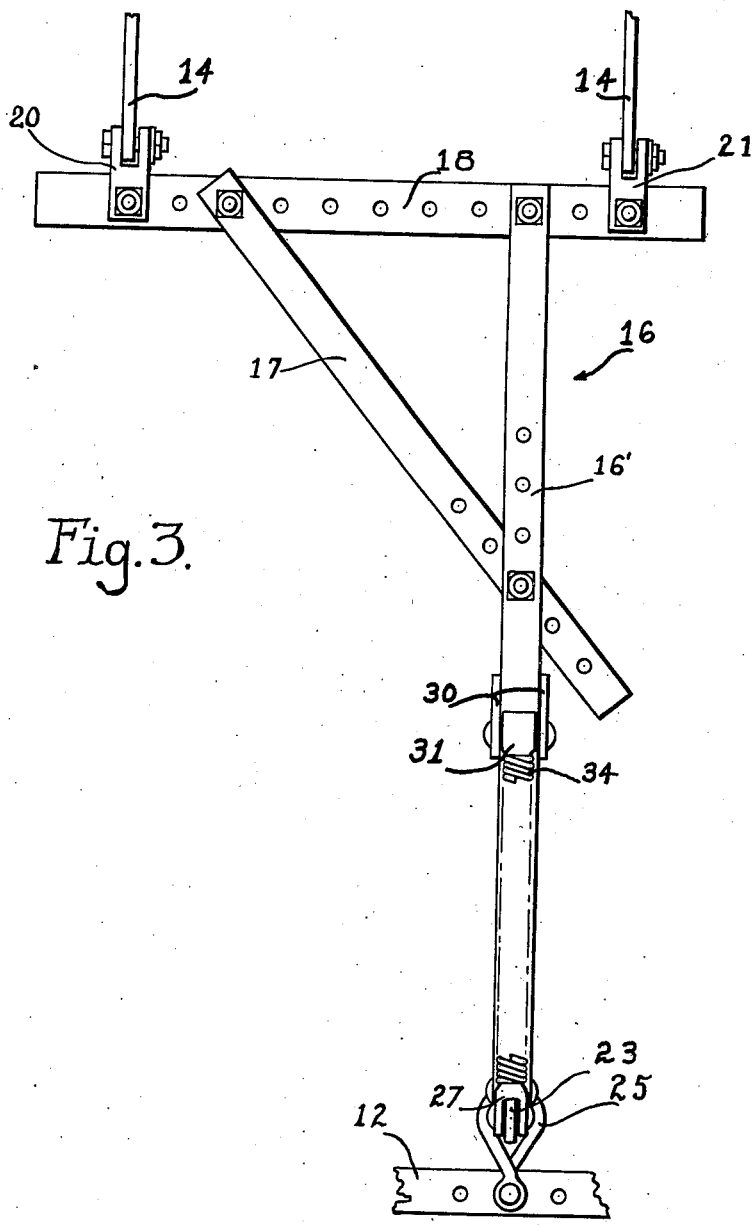

Referring now to the drawings, there is shown a tractor 10 having a rear axle structure 11 to which is connected a draw-bar 12 extending rearwardly behind the tractor and adapted for the connection thereto of a pull-behind implement 13. The pull-behind implement 13 has a draft connection 14 which serves as a base for the connection thereto of the spring release device, indicated generally at 15. Referring particularly to Figure 3, it will be noted that this draft connection includes one forwardly extending draft or base member 16, a diagonally disposed base member 17, and a transversely extending member 18, to which the rearward ends of the members 16 and 17 are connected. This transverse member 18 is connected to the draft connection 14 of a frame 19 of the pull-behind implement by the clevis connections 20 and 21. In all three of the members 16, 17, and 18, there is provided a set of longitudinally alined holes for the purpose of arranging the respective members in different positions with respect to each other. On the forward end of the base member, as shown more clearly in Figure 2, there is pivoted a latch member 23 having a recess 24 adapted to receive a cooperating element or clevis 25 which is carried on the draw-bar 12 of the tractor. The draft member 16 includes upper and lower members 16' and 16''. The upper draft member 16' is folded back upon itself at its forward end to provide for the pivotal connection thereto of the latch member 23, as indicated at 26.

Coming now more particularly to the feature of the present invention, there is pivoted to the upper end of the latch element 23 a pivotal element 27, as indicated at 28. This pivotal element has a threaded portion 29 offset from its pivot axis 28. Rearwardly of the latch element and connected to the base member 16' is a bracket 30 which has pivoted to it a second pivotal element 31 similar to the pivotal element 27. This pivotal element 31 also has an offset threaded portion 32 which is offset with respect to the pivotal axis 33 of its connection with the bracket 30. The threaded portions of these pivotal elements 27 and 31 oppose each other and receive a coil spring 34, the ends of which are respectively threaded on the threaded portions 28 and 32. By having the spring ends pivotally connected to the pivotal elements, the spring remains connected to the same regardless of whether the coil spring 34 is in tension or in compression.

When the latch element 23 is in its unreleased position with the cooperating element 25 on the tractor within the recess 24 thereof, the coil spring 34 is in its unbuckled state with the respective coil elements axially alined. An axis through the coil spring when in this position is indicated at A, and it will be noted that this axis is offset with respect to an axis through the pivotal connection of the respective pivotal elements 27 and 31 carried respectively between latch elements 23 and bracket structure 30. The amount of this offset is more or less immaterial, it being sufficient that there be only the slightest of offset to have the device function to release upon receiving excessive strain.

Immediately beneath the coil spring and in contact therewith is an adjusting screw 35 threaded with the base member 16' and adapted to be fixed in any setting thereof by a locking nut 36. With this adjusting nut the resistive force of the coil spring can be regulated. The adjusting nut may be raised sufficiently so as to permit the coil spring to straighten out to its normal position, and in this manner lessen the amount of force required to buckle the same. This adjusting screw works within definite limits and is effective to vary the resisting tendency of the spring to buckle.

As the strain upon the spring 34 becomes excessive, due to some obstruction met with by the implement 13 being pulled by the tractor 10, the latch member 23 will tend to pivot about its pivotal connection 26 with its base member 16 to place a compression force upon the coil spring, and the pivotal elements 27 and 31 being offset with respect to the pivotal connection with the latch and bracket members 23 and 24, compression will take place along the lower edge of the coil spring, thereby permitting the respective coils at their upper edge to leave one another. When this compression of the spring on its lower edge is sufficient, and due to the buckling characteristic of coil springs, the spring will suddenly buckle to its maximum amount, as shown in dotted in Figure 2. This buckling of the spring permits the latch element to suddenly rotate in a clockwise direction, as viewed in Figure 2, to allow the cooperating clevis element 25 to release from the recess 24 and to thereby free the implement of the tractor. Once the implement has been freed the latch element 23 will be returned to its original position by the coil spring 34. When the obstruction is removed from the implement, the draft connection can again be connected with the tractor.

It should now be apparent that there has been provided a release hitch device for the coupling of implements to tractors which is of a simple construction and includes a simple means for adjusting same.

While various changes may be made in the detail construction of the arrangement, it is understood that such changes shall be made without departing from the spirit and scope of the present invention as defined by the appended claims.

What is claimed is:

1. In a release hitch device for tractors, a supporting element adapted to be connected to a tractor, a latch element pivoted to the supporting element and adapted for the connection thereto of a hitch member of an implement, a buckling spring, and means for connecting the buckling spring between said two elements normally to resist relative pivotal movement therebetween, but to buckle suddenly upon a predetermined force being applied to pivot the latch element with respect to the supporting element, said connecting means including a pivotal member pivotally connected to one of said elements, and said pivotal member having a connecting portion for the spring offset with respect to the axis of pivotal connection of the member with the element to insure thereby sudden buckling of the spring.

2. In a release hitch device for tractors, a supporting element adapted to be connected to a tractor, a latch element pivoted to the supporting element and adapted for the connection of a hitch member of an implement thereto when in its normal position for the pulling of the implement, a buckling spring, and means for pivotally connecting the ends of said spring respectively to the supporting element and to the latch element to permit the same to buckle for unlatching of the hitch element of the implement from the latch element when the implement meets with an obstruction, said pivotal connecting means including pivotal members respectively pivotally connected to the supporting and hitch elements, each of the members having a connecting portion for the spring offset with respect to the axis of pivotal connection of the member with the element, whereby the buckling spring will be offset with respect to a line drawn between the pivotal connection of the members with the elements to thereby insure sudden buckling of the buckling spring.

3. In a release hitch device for tractors, a supporting element adapted to be connected to a tractor, a latch element pivoted to the supporting element and adapted for the connection of a hitch member of an implement thereto when in its normal position for the pulling of the implement, a buckling spring, means for pivotally connecting the ends of said spring respectively to the supporting element and to the latch element to permit the same to buckle for unlatching of the hitch element of the implement from the latch element when the implement meets with an obstruction, said connecting means including a pivotal member pivotally connected to one of said elements, and said pivotal member having a connecting portion for the spring offset with respect to the axis of pivotal connection of the member with the element to insure thereby sudden buckling of the spring, and adjustable means for varying the effectiveness of the device to resist the unlatching of the latch element.

4. In a release hitch device for tractors, a supporting element adapted to be connected to a tractor, a latch element pivoted to the supporting element and adapted for the connection of a hitch member of an implement thereto when in its normal position for the pulling of the implement, a buckling spring, means for pivotally connecting the ends of said spring respectively to the supporting element and to the latch element to permit the same to buckle for unlatching of the hitch element of the implement from the latch element when the implement meets with an obstruction, said pivotal connecting means including pivotal members respectively pivotally connected to the supporting and hitch elements, each of the members having a connecting portion for the spring offset with respect to the axis of pivotal connection of the member with the element, whereby the buckling spring will be offset with respect to a line drawn between the pivotal connection of the members with the elements to thereby insure sudden buckling of the buckling spring and an adjustable stop means on the suporting element and contacting with the side of the spring between the ends of the same to prevent, if desired, the return of the spring to its normally straight position and thereby to vary the effectiveness of the device to resist the unlatching of the latch element.

5. In combination, a tractor element, an implement element, and releasable hitch means for connecting the two elements together including a latch member pivoted on one of the elements and adapted for locking engagement with the other of said elements, means being provided on the other of said elements for the engagement therewith of a latch member, a buckling spring, and means for connecting the buckling spring between the pivoted latch member and the one of said elements normally to resist pivotal movement of the latch member but to buckle suddenly upon a predetermined force being applied to pivot the latch member and to thereby release the other of said elements, said connecting means including a pivotal member pivotally connected to one of said elements, and said pivotal member having a connecting portion for the spring offset with respect to the axis of pivotal connection of the member with the element to insure thereby sudden buckling of the spring.

6. In combination, a tractor element, an implement element, and releasable hitch means for connecting the two elements together including a latch member pivoted on one of the elements and adapted for locking engagement with the other of said elements, means being provided on the other of said elements for the engagement therewith of a latch member, a buckling spring, and means for connecting the buckling spring between the pivoted latch member and the one of said elements normally to resist pivotal movement of the latch member but to buckle suddenly upon a predetermined force being applied to pivot the latch member and to thereby release the other of said elements, said connecting means including a pivotal member pivotally connected to one of said elements, and said pivotal member having a connecting portion for the spring offset with respect to the axis of pivotal connection of the member with the element to insure thereby sudden buckling of the spring and adjustable means for varying the effectiveness of the device to resist unlatching of the latch member.

JAMES MORKOSKI.